United States Patent [19]

Brown

[11] Patent Number: 5,373,736
[45] Date of Patent: Dec. 20, 1994

[54] ACOUSTIC CURRENT METER

[75] Inventor: Neil L. Brown, Falmouth, Mass.

[73] Assignee: Woods Hole Oceanographic Institute, Woods Hole, Mass.

[21] Appl. No.: 850,381

[22] Filed: Mar. 11, 1992

[51] Int. Cl.$^5$ .................................................. G01F 1/00
[52] U.S. Cl. ................................ 73/170.13; 73/861.27
[58] Field of Search ............ 73/861.28, 170 A, 170.11, 73/170.13, 861.27, 861.28, 861.31

[56] References Cited

U.S. PATENT DOCUMENTS

| | | | |
|---|---|---|---|
| 2,871,460 | 1/1959 | Beebe | 73/861.28 |
| 3,861,211 | 1/1975 | Dewain | 73/170.13 |
| 3,949,605 | 4/1976 | Stallworth et al. | 73/170 A |
| 4,038,870 | 8/1977 | Rotier | 73/170.13 |
| 4,094,193 | 6/1978 | Gerlach | 73/170 A |
| 4,221,128 | 9/1980 | Lawson et al. | 73/170 A |
| 4,258,568 | 3/1981 | Boetes et al. | 73/170 A |
| 4,262,545 | 4/1981 | Lamarche et al. | 73/170.13 |
| 4,391,136 | 7/1983 | Perkins et al. | 73/170 A |
| 4,552,016 | 11/1985 | Suyama | 73/170 A |
| 4,782,697 | 11/1988 | Williams | 73/170 A |
| 4,856,321 | 8/1989 | Smalling et al. | 72/40.5 A |
| 4,890,488 | 1/1990 | Pincent et al. | 73/170.13 |
| 5,035,147 | 7/1991 | Woodward | 73/861.28 |

OTHER PUBLICATIONS

Lawson et al., "A Three axis acoustic current meter for small scale Turbulence"; Proceedings of the 22nd International Instrumentation Symposium pp. 501–508 (25–27 May 1976).

*Primary Examiner*—Richard E. Chilcot, Jr.
*Assistant Examiner*—Elizabeth L. Dougherty
*Attorney, Agent, or Firm*—Robbins, Berliner & Carson

[57] ABSTRACT

An acoustic current meter in which a CW burst is transmitted first in one direction along each acoustic path and then in the reverse direction along such path so that a single receiver system may be used and phase shift and/or d.c. offsets canceled. Four orthogonal components of current are measured so that the axis contaminated by the center support strut may be eliminated from further computation. A direction sensor includes a 3 axis magnetometer using feedback to minimize current requirements and a two axis accelerometer aligned therewith as a tilt sensor.

8 Claims, 5 Drawing Sheets

ACOUSTIC CURRENT METER

ORIGIN OF THE INVENTION

The invention described herein was made in the performance of work under ONR contract N. N00014-86-K-0751, and is subject to the provisions of Public Law 96-517 (35 USC 202) in which the Contractor has elected to retain title.

BACKGROUND OF THE INVENTION

1. Field of the Invention

The present invention relates to techniques for the measurement of fluid velocity and, in particular, to acoustic current meters for ocean deployment.

2. Description of the Prior Art

As the science of climatology and oceanography advance, observations at sea must be obtained more frequently and at shorter geographic intervals. One limiting factor is the high cost of conventional current meter designs and the associated costs for deployment and mooring systems.

Conventional current meters typically include relatively large, expensive electronics and battery packages and have limited operation lives. Current meters using mechanical sensors, such as rotors or impellers, are vulnerable to
damage and are easily stalled by marine fouling or flotsam of various kinds.

Conventional acoustic current meters using two orthogonal pairs of transducers and an acoustic mirror have poor vertical and horizontal cosine response due to flow interaction with the mirror and struts used to carry mooring tension around the pressure housing. Conventional acoustic current meters transmit pulses or continuous wave—or CW—bursts simultaneously in opposite directions and then compare the difference in arrival times or the phase difference between the received signals to determine current velocity. Such instruments require two receivers and are subject to errors due to changes in phase shift or time delay differences between the receivers.

Such conventional instruments require gimballed compasses, such as magnetometers or mechanical compasses with optical readouts, which tend to be fragile, expensive and of limited accuracy. The direction sensors in conventional instruments used either gimballed compass cards with optical readouts or gimballed 2 axis fluxgate magnetometers. The designs including compass cards are fragile, expensive and do not have good dynamic response because of the inertia of the cards and the low magnetic torque inherent in such compass cards. The gimballed fluxgate designs require jewel bearings to minimize errors due to imperfect leveling caused by bearing stickiness. As a result, such designs required enclosure of the gimballed fluxgate in an oil filled chamber to provide damping. What is needed is an improved acoustic current meter design which is less expensive to produce, deploy and moor and does not suffer from the limitations of known designs.

SUMMARY OF THE INVENTION

The preceding and other shortcomings of the prior art are addressed and overcome by the present invention that provides, in a first aspect, an acoustic current meter including a pair of transducers in contact with a current to be measured, means associated with the transducers for transmitting a CW burst through the current in one direction along a path therebetween, means for subsequently transmitting a CW burst in the opposite direction between said transducers, means for generating a series reference signals which are related to phase shifted versions of each CW burst as transmitted, means associated with said transducers for receiving the transmitted CW bursts, means for determining the phase shift of each CW burst as received by comparison with the series of phase shifted versions of the CW burst as transmitted, and means for determining the component of current parallel with the path between the transducers in accordance with the difference in phase shifts experienced by CW bursts transmitted in both directions therebetween.

In a further aspect, the acoustic current meter according to the present invention includes three additional pairs of transducers, and means for determining the component of current parallel with the path between each additional pair of transducers in accordance with the difference in phase shifts experienced by CW bursts transmitted in both directions between said pair.

In another aspect, the present invention provides a direction sensor responsive to the earth's magnetic field including three orthogonally mounted fluxgate magnetometer cores, each such core subject to the earth's magnetic field and having a driving and a sensing coil associated therewith, means for exciting each of said driving coils in series at a first frequency and for providing a reference signal at an even harmonic of said first frequency, means associated with the sensing coils for generating a separate d.c. signal in response to the presence of said even harmonic in each of said sensing coils by comparison with said reference signal, and feedback means for applying each of said separate d.c. signals to the sensing coil associated therewith, whereby each said separate d.c. signal represents the magnitude of an orthogonal component of the earth's magnetic field.

In a further aspect the direction sensor according to the present invention includes means for determining acceleration of along two of said orthogonal components.

The foregoing and additional features and advantages of this invention will become further apparent from the detailed description and accompanying drawing figures that follow. In the figures and written description, numerals indicate the various features of the invention, like numerals referring to like features throughout both the drawing figures and the written description.

DETAILED DESCRIPTION OF THE PREFERRED EMBODIMENTS

Figure 1:
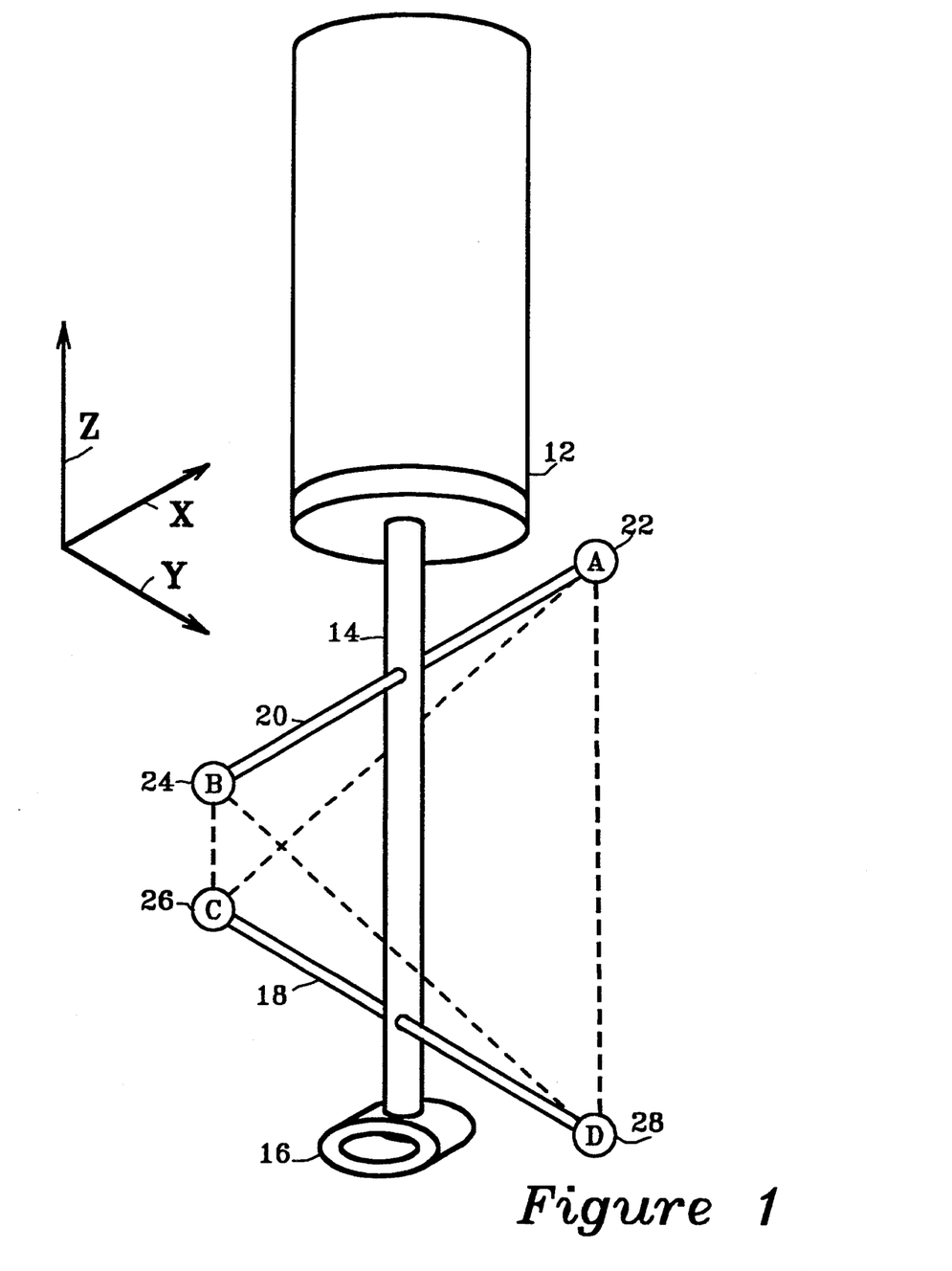
FIG. 1 is an isometric view of an acoustic current meter according to the present invention.

Referring now to FIG. 1, acoustic current meter 10 includes electronic housing 12 mounted at one end of center support strut 14 and mooring attachment 16 at the other end. The electronic circuitry contained in electronic housing 12 is shown and described in greater detail with reference to FIG. 3 below. Cross bars 18 and 20 support piezo-electric transducers 22, 24, 26, and 28 forming the acoustic measurement path ends A, B, C, and D, respectively. Cross bars 18 and 20 are perpendicular to each other in the XY plane and separated from each other along the vertical or Z axis. In a preferred embodiment, each of the acoustic paths between a pair of path ends is 15 cm while the vertical separation of the cross bars is 10.5 cm.

Acoustic current meter 10 provides four acoustic paths, only one of which will be contaminated by wake turbulence. These four paths represent four axes of data, but only three axes are required for a complete solution of the X, Y, and Z components of velocity. In accordance with the direction sensor, described below in greater detail with reference to FIGS. 3 and 4, the quadrant in the XY plane from which the current is flowing is determined. The data axis contaminated by the wake from center support strut 14 may then advantageously be determined and eliminated from the solution of current flow components.

Figure 2:
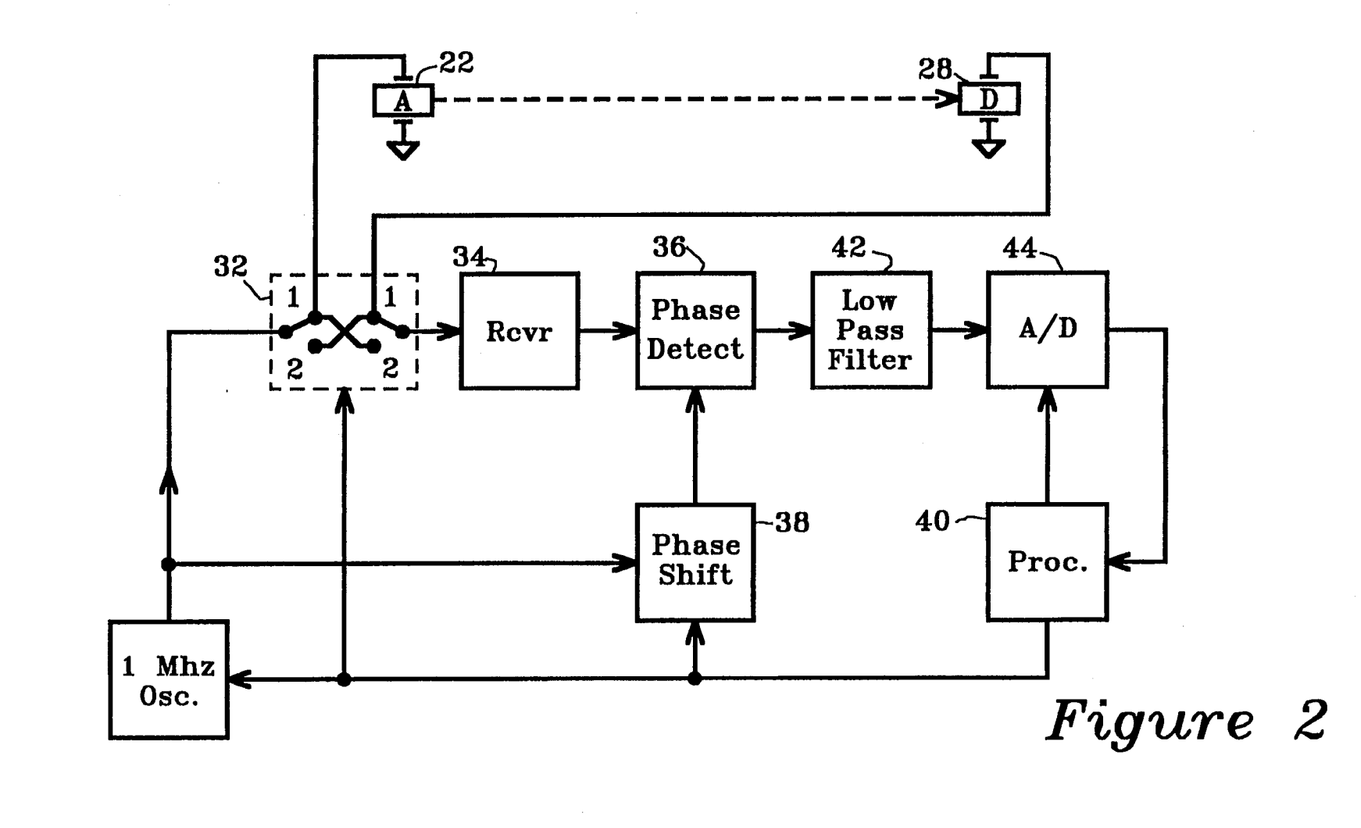
FIG. 2 is a block diagram of one of the eight acoustic paths used for current measurement in the acoustic current meter shown in FIG. 1

As can be seen in FIG. 1, the configuration of acoustic current meter 10 according to the present invention with mooring attachment 16 at the bottom of center support strut 14 permits the direct connection of the mooring system used for deployment to the primary strength member of acoustic current meter 10, rather than requiring that mooring stress be transferred across or around electronic housing as required in conventional designs. Referring now to FIG. 2, the theory of operation of acoustic current meter 10 will first be explained followed by a detailed description of a preferred embodiment of the velocity sensor system used for one of the acoustic paths.

In operation of the preferred embodiment, a 1 Mhz continuous wave signal transmitted by oscillator 30 is applied via transmit/receive switch 32 in one direction, for example, from transducer 22 at acoustic path end A to transducer 28 at acoustic path end D. Oscillator 30 is applied in switch position 1, as shown in FIG. 2, to transducer 22 when transducer 28 is applied to receiver 34 which may conveniently be a tuned amplifier set to 1 Mhz, the carrier frequency. The total phase shift of the signal received along acoustic path AD, which includes the phase shift of receiver 34, is then measured as will be described below in greater detail.

Thereafter, transmit/receive switch 32 is then caused to operate in switch position 2 in which oscillator 30 is applied to transducer 28 while transducer 22 is connected to receiver 34. The process is then repeated so that the CW burst is transmitted from transducer 28 to transducer 22 and the total phase shift of the signal received along acoustic path DA is measured. The velocity of the current parallel to acoustic paths AD and DA is proportional to the difference between these total phase shifts along paths in opposite directions and may then be determined.

A simple and accurate but low power circuit, described in more detail below, is used for measuring phase shift at the carrier frequency. Since receiver 34 is used for measurements in both directions, errors due to the use of two receivers in conventional systems, such as those due to different receiver phase shifts or offset errors in the phase sensitive detectors, are eliminated by cancellation when the difference in total phase shifts are used for current velocity measurements.

In particular, the total phase shift between received and transmitted signals may be determined as follows:

$$\Theta_{ad} = \Theta_{ta} + \Theta_{rd} + \Theta_{ttad} + \Theta_{rec} \quad (1)$$

$$\Theta_{da} = \Theta_{td} + \Theta_{ra} + \Theta_{ttda} + \Theta_{rec} \quad (2)$$

where $\Theta_{ta}$ and $\Theta_{td}$ are the phase angles between the applied voltage and the resulting acoustic pressure wave for transducers 22 and 28 acting as transmitters. Similarly, $\Theta_{ra}$ and $\Theta_{rd}$ are the phase angles between the output voltage and the arriving acoustic pressure waves for transducers 22 and 28 acting as receivers. $\Theta_{ttad}$ and $\Theta_{ttda}$ are the phase shifts due to the acoustic travel times along acoustic path AD and DA, respectively. $\Theta_{rec}$ is the phase shift through receiver 34.

It can be shown that for any piezoelectric transducer, such as transducers 22, 24, 26, and 28, when driven by an essentially zero impedance generator or loaded by an essentially zero impedance receiver, the transmitting and receiving phase angles between the voltage applied or output and the acoustic pressure wave are identical, that is, $$\Theta_{ta} = \Theta_{ra} \quad (3)$$

$$\Theta_{td} = \Theta_{rd}. \quad (4)$$

The difference between the total phase shifts may therefore be determined by combining equations (1) and (2) above, as follows:

$$\Theta_{da} = \Theta_{ttad} - \Theta_{ttda}, \quad (5)$$

which may then be expanded to $$\theta_{ad} - \theta_{da} = \frac{\omega d}{c - v} - \frac{\omega d}{c - v} \quad (6)$$

where $\omega$ is the angular frequency in radians per second, d is the distance between transducers 22 and 28 in centimeters, c is the velocity of sound in centimeters per sec, and v is the component of velocity of the ocean current along acoustic paths AD and DA.

The phase difference may then be expressed as $$\theta_{ad} - \theta_{da} = -\frac{2\omega v d}{c^2 - v^2} \quad (7)$$

and the velocity may then be expressed as $$v = c^2 \left[ \frac{\theta_{ad} - \theta_{da}}{2\omega d} \right], \quad (8)$$

where c is much greater than v.

Referring now to the detailed operation of the system shown in FIG. 2, the output of receiver 34 is applied to phase sensitive detector 36 which receives as a second input a replica of the CW burst transmitted by oscillator 30 after the replica has been processed by precision phase shifter 38 under the control of system processor 40. Precision phase shifter 38 alternately applies phase shifts of 0°, 90°, 180°, and 270°.

In operation, system processor 40 controls transmit/receive switch 32 to select switch position 1, connecting transducers 22 and 28 to oscillator 30 and receiver 34, respectively, thus transmitting a CW burst from acoustic path end A to acoustic path end D along acoustic path AD. Precision phase shifter 38 is initially set to 0° phase shift and the output of phase sensitive detector 36, after suitable low pass filtering in filter 42, is digitized in analog to digital—or A/D—converter 44 and the result is stored in system processor 40. Thereafter the process is repeated with phase shift settings of 90°, 180°, and 270° in precision phase shifter 38.

The digitized values stored in system processor 40 for phase shifts of 0° and 180° are used as the so-called "in-phase component" of the velocity which is directly proportional to the difference between the 0° and the 180° readings regardless of any DC offset in phase sensitive detector 36. Similarly, the 90° and 270° readings are used to obtain the "quadrature component" of the received signal. The in-phase and quadrature components of the received signal are then processed in system processor 40 to calculate the phase angle, $\Theta_{ad}$, between the received and transmitted signals.

The process is then repeated after transmit/receive switch 32 has been operated by system processor 40 to select switch position 2 in which transducers 22 and 28 are connected to receiver 34 and oscillator 30 respectively to transmit a CW burst in the opposite direction, that is, along acoustic path DA. This permits the calculation of the phase angle $\Theta_{da}$ so that the component of velocity parallel to the AD axis, including transducers 22 and 28, may be determined in accordance with equation (8), above.

Similar processes are then performed to determine the phase differences and therefore current velocities for the remaining three axes of acoustic current meter 10, that is, the AC axis including transducers 22 and 24, the BC axis including transducers 24 and 26, and the BD axis including transducers 24 and 28. The results are all stored in system processor 40.

As noted above, these calculations are based on the assumption that the impedance of the transmit and receive circuitry is very small when compared with the impedance of transducers 22, 24, 26, and 28. When this condition is met, the phase angle between the acoustic and electrical signals are the same for each transducer whether it is transmitting or receiving thus insuring the integrity of the phase shift information.

Phase sensitive detector 36 may be an analog multiplier whose instantaneous output is the instantaneous product of the inputs from receiver 34 and precision phase shifter 38, $E_r$ and $E_s$, respectively. These signals are given by the following equations:

$$E_s = K_s \sin(\omega t + \Theta_s), \quad (9)$$

and $$E_r = K_r \sin(\omega t + \Theta_r), \quad (10)$$

where $K_s$ and $K_r$ are constants.

The output voltage, $E_{out}$, is equal to the product of these signals, such that $$E_{out} = \frac{K_s K_r}{2} [\cos(\theta_s - \theta_r) - \cos(2\omega t + \theta_r \theta_s)]. \quad (11)$$

$E_{out}$ is applied to filter 42 for low pass filtering to produce $E_{dc}$ which is given by the equation $$E_{dc} = K \cos(\Theta_s - \Theta_r) + E_{os}, \quad (12)$$

where K is one half the product of $K_s$ and $K_r$ and $E_{os}$ is the zero offset of phase sensitive detector 36. If $\Theta_r$ is 0°, then $E_{os}$ may be determined as follows:

$$E_0 = E_{dc} = K \cos(\Theta_s) + E_{os}. \quad (13)$$

Similarly, when $\Theta_r$ is equal to 90°, 180°, and 270°, $E_{os}$ may be determined as follows:

$$E_{90} = E_{dc} = -K \sin(\Theta_s) + E_{os} \quad (014)$$

$$E_{180} = E_{dc} = -K \cos(\Theta_s) + E_{os}, \quad (15)$$

and $$E_{270} = E_{dc} = K \sin(\Theta_s) + E_{os}. \quad (16)$$

Therefore the difference between $E_0$ and $E_{180}$ is $2K \cos \Theta_s$ while the difference between $E_{270}$ and $E_{90}$ is $2K \sin \Theta_s$ so that the following equation holds true:

$$\theta_s = \arctan\left[\frac{(E_{270} - E_{90})}{(E_0 - E_{180})}\right] \quad (17)$$

Hence, $\Theta s$ is independent of the gain or any d.c. offset in phase sensitive detector 36. In order to achieve this independence, it is only necessary that there be a linear relationship between the output of phase sensitive detector 36 and the cosine of the phase angle between the signal and reference inputs thereto.

Figure 3:
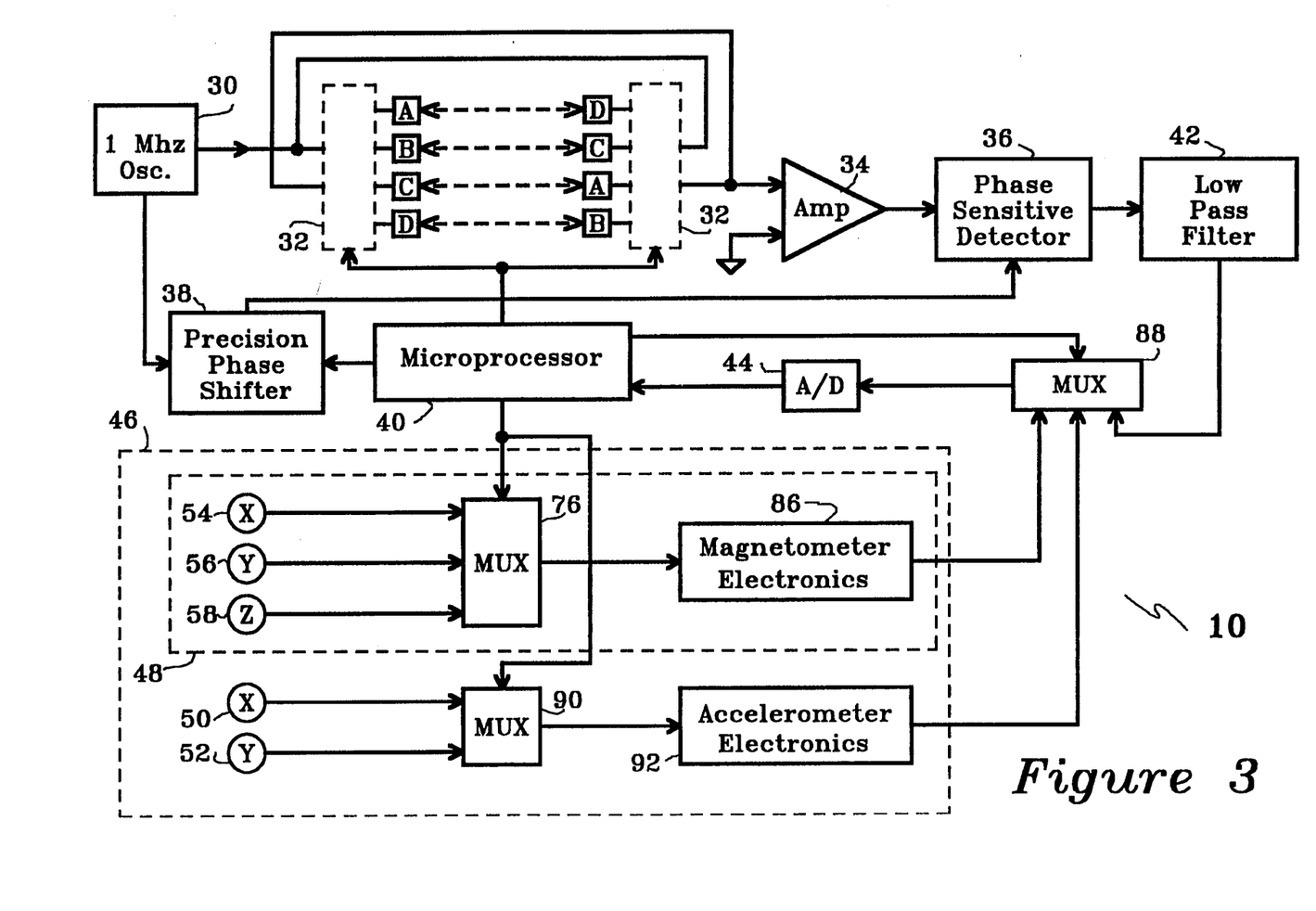
FIG. 3 is a block diagram schematic of the current meter shown in FIG. 1. P

Referring now to FIG. 3, a block diagram of acoustic current meter 10 is shown which includes the circuitry for all eight acoustic paths, as well as direction sensor 46 for determining the orientation of acoustic current meter 10 and therefore of the acoustic paths. In acoustic current meter 10, oscillator 30 drives both sides of transmit/receive switch 32 so that all transducers 22, 24, 26, and 28 are alternately used for transmitting and receiving, in sequence.

The received signals are applied by transmit/receive switch 32 to receiver 34 which may conveniently be a 1 Mhz tuned amplifier, as shown. The CW burst from oscillator 30 is also applied to precision phase shifter 38 to generate the series of phase shifted reference signals, under the control of system processor 40, which are then compared with the output of receiver 34 in phase sensitive detector 36. After low pass filtering in filter 42, the phase data from phase sensitive detector 36 is multiplexed, under the control of system processor 40, by A/D multiplexer 88 together with signals from direction sensor 46 for digitizing by A/D converter 44 and storage in system processor 40.

All eight acoustic paths are processed in sequence so that the forward and reverse travel paths for each pair of transducers is used to develop the four components of velocity data for currents parallel with the axes between each such pair of transducers. The magnetic direction and angle of tilt of acoustic current meter 10 must also be determined by direction sensor 46 so that the magnetic direction and tilt of the current can be determined and recorded. The quadrant in the XY plane from which the current is coming is also determined in system processor 40 so that the axis potentially contaminated by the wake of center support strut 14 may be eliminated from the computations for increased accuracy.

Direction sensor 46 includes 3 axis fluxgate magnetometer 48 described below in greater detail with reference to FIG. 4, as well as accelerometers 50 and 5Z configured as a 2 axis tilt sensor.

3 axis fluxgate magnetometer 48 is designed for low power consumption and is used to determine the X, Y and Z components of the magnetic heading of acoustic current meter 10 while accelerometer 50 is aligned with the X axis and accelerometer 52 is aligned with the Y axis to form a tilt sensor for determining the tilt of acoustic current meter 10 with regard to the Z axis. Any small errors in alignment of any of the sensors may be determined during calibration and numerically corrected by system processor 40.

Magnetometer 48 includes magnetic cores 54, 56, and 58 aligned with the X, Y, and Z components of the magnetic heading, respectively, the outputs of which are applied by multiplexer 76 to magnetometer electronics 86, described below in greater detail with reference to FIG. 4. The output of magnetometer electronics 86 is applied under the control of system processor 40 to A/D multiplexer 88 for digitizing and storage. The two axis tilt sensor is formed, for example, from a pair of commercially available solid state accelerometers from IC Sensors of Milpitas, CA used as accelerometers 50 and 52. The outputs of accelerometers 50 and 52 are applied by multiplexer 90 to accelerometer electronics 92, the output of which is applied under the control of system processor 40 to A/D multiplexer 88 for digitizing and storage.

Figure 4:
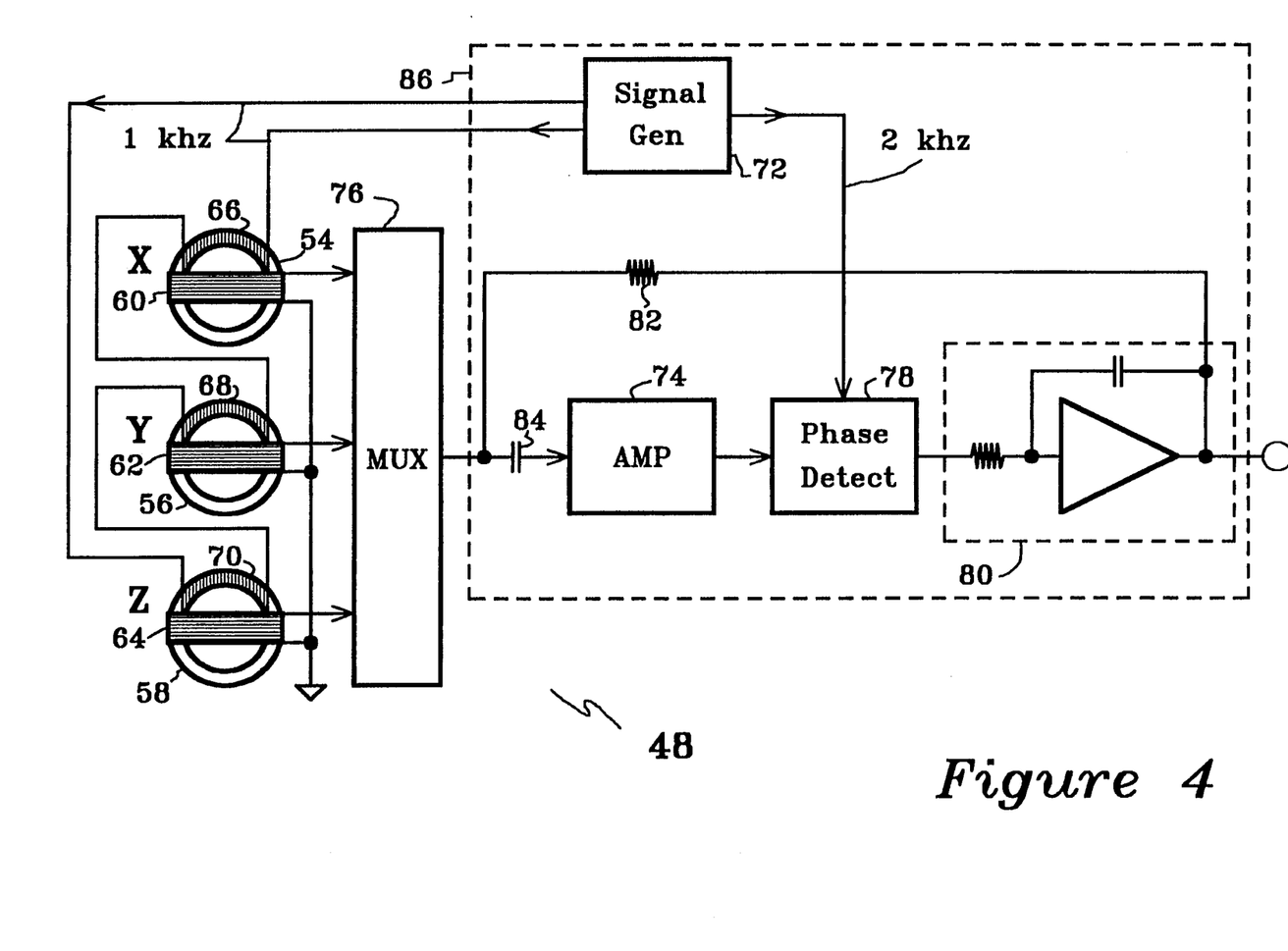
FIG. 4 is a schematic diagram of the low power, three axis magnetometer used in the direction sensor shown in FIG. 3.

Referring now to FIG. 4, 3 axis fluxgate magnetometer 48 includes magnetic cores 54, 56, and 58 for sensing the X, Y and Z axis components of magnetic flux density and magnetometer electronics 86. Magnetometer electronics 86 may be a single channel circuit as described, the input of which is multiplexed by multiplexer 76.

Magnetometer 48 achieves very low power consumption by using magnetic cores with very low small cross sections for magnetic cores 54, 56, and 58 thus reducing the energy required to magnetically saturate each such core and is based on an adaptation of the "ring-core" design described by W. A. Geyger in "The Ring-Core Magnetometer—a New Type of Second Harmonic Fluxgate Magnetometer", *Trans. AIEE (Commun. Electron.)* 51, pp. 65–73, March 1962.

Each axis consists of a Supermalloy tape wound toroid bobbin core, such as cores 54, 56, and 58, each wound with a 100 turn drive winding shown as drive windings 66, 68, and 70, respectively which may conveniently be wound around the entire circumference of each core. Each such core is surrounded by a sense coil, such as sense coils 60, 62, or 64, whose axis is parallel to the plane of the core. Drive windings 66, 68, and 70 are connected in series and excited with a 1 khz square wave from square wave generator 72 in magnetometer electronics 86 of sufficient amplitude to saturate each such core.

In the absence of any d.c. magnetic field, the signals in sense coils 60, 62 or 64 contain only the odd harmonics of the drive signal because all parts of the cores go into saturation at the same time. However, the presence of a d.c. magnetic field will cause one side of the core to go into saturation slightly before the otherside because d.c. and a.c. components add on one side and subtract on the other.

This results in an unbalance in signal in the sense coil resulting from the second harmonic of the excitation. The output from each core is applied by multiplexer 76 to tuned amplifier 74, in magnetometer electronics 86, which is tuned for the 2 khz second harmonic. Tuned amplifier 74 may conveniently have a Q of about 10 and a gain of about 30.

The 2 khz output of tuned amplifier 74 is applied, along with a 2 khz reference signal from square wave generator 72, to phase sensitive detector 78 for detection. When the 2 khz signal is present in the output of the core applied to tuned amplifier 74 by multiplexer 76, the output of tuned amplifier 74 contains a d.c. term which is integrated in integrator 80. The output of integrator 80 is applied by feedback resistor 82 to the appropriate sense coil via multiplexer 76 to complete a negative feedback system which balances the earth's magnetic field with an equal and opposite field in the sense coil. Other even harmonics may be used in place of the second harmonic, if desired.

The field generated in the sense coil is the proportional to the product of the number of turns in the sense coil and the feedback current $I_{fb}$. To minimize power consumption, the maximum value of required feedback current was minimized by winding sense coils 60, 62 and 64 with a large number of turns, on the order of 5000 turns in the preferred embodiment.

The sense coil output voltage, $E_{scout}$, is equal to the product of the feedback resistance $R_{fb}$ of feedback resistor 82 and the feedback current $I_{fb}$, and is therefore directly proportional to the magnetic field parallel to the axis of the sense coil being applied to tuned amplifier 74 by multiplexer 76. One advantage of this negative feedback system is that the calibration of 3 axis fluxgate magnetometer 48 is essentially insensitive to any changes in the magnetic properties of the sense coil cores. Capacitor 84 is used to block any d.c. from feedback resistor 82 from entering tuned amplifier 74.

Referring now again to FIG. 3, the total power consumption of direction sensor 46 according to preliminary test results of the preferred embodiment of the present invention may be less than 2.4 mw.

Referring now to FIG. 1, preliminary calculations indicate that electronic housing 12 may be as small as about 5 cm OD by 30 cm long, so that it may be practical to fabricate electronic housing 12 from titanium, thus avoiding the magnetic problems associated with stainless steel as well as the corrosion problems associated with high strength aluminum.

Figure 5:
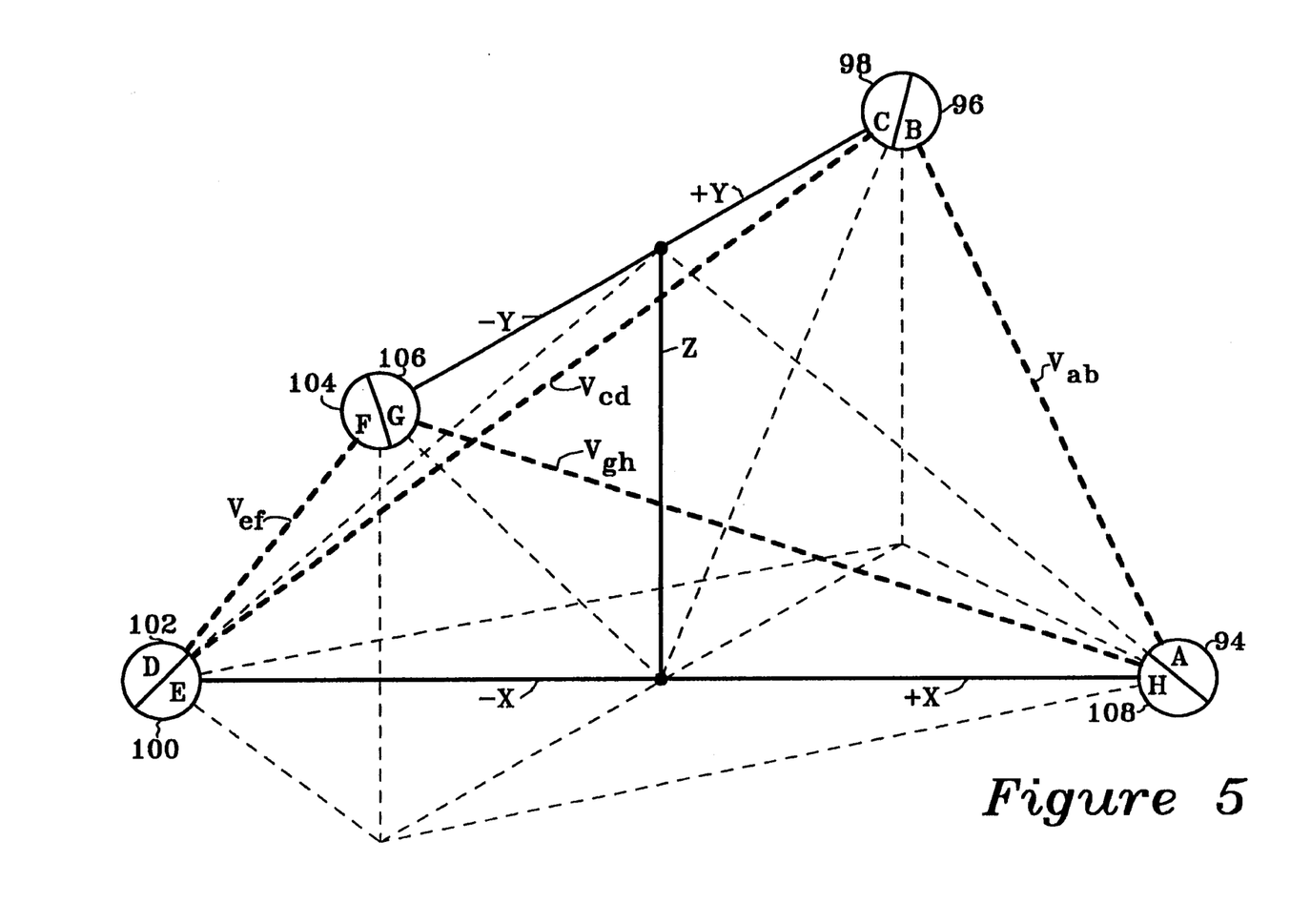
FIG. 5 is a vector diagram of current velocity components along the acoustic paths of the preferred embodiment of the present invention.

Referring now to FIG. 5, a vector diagram of a preferred embodiment of the present invention is shown from which the analysis to determine the wake contaminated acoustic path may be described. In this preferred embodiment, a pair of acoustic transducers is used at each acoustic path end—one aimed along each acoustic path—rather than a single transducer as more generally described in the earlier drawings. The letters representing the acoustic paths used in FIG. 5 therefore do not represent the same paths discussed above with respect to the previous figures.

As shown in FIG. 5, the transducers used in the preferred embodiment have a relatively narrow beam at the frequency of interest so that for acoustic path AB, transducer 94 at acoustic path end A is focussed on transducer 96 at acoustic path end B. However, acoustic path end C —which is co-located with acoustic path end B—has its own separated transducer, transducer 98, focussed on transducer 100 at acoustic path end D.

Acoustic path end E is co-located with acoustic path end D and employs transducer 102 which is focussed along acoustic path EF on transducer 104 at acoustic path end F. Similarly, acoustic path end G is co-located with acoustic path end F and employs transducer 106 which is focussed along acoustic path GH on transducer 108 at acoustic path end H which is co-located with transducer 94 at acoustic path end A.

The four acoustic paths shown in this figure are therefore acoustic paths AB, CD, EF, and GH. The following analysis will use the convention, as shown in FIG. 5, that the X component of velocity, $V_x$, is positive in the direction from acoustic path ends D and E to acoustic path ends A and H, the Y component of velocity, $V_y$, is positive in the direction from acoustic path ends F and G to acoustic path ends C and B, and the Z component of velocity, $V_x$, is positive in the upwards direction.

The velocity along acoustic path AB from transducer 94 to transducer 96, $V_{ab}$, is then given by the following equation:

$$V_{ab} = -V_x^* \cos(\Theta_{abx}) + V_y^* \cos(\Theta_{aby}) + V_z^* \cos(\Theta_{abz}) \tag{18}$$

where $$\cos(\Theta_{abx}) = X/L = A \tag{19}$$

$$\cos(\Theta_{aby}) = Y/L = B \tag{20}$$

$$\cos(\Theta_{abz}) = Z/L = C, \tag{21}$$

and $$L = SQR(X^2 + Y^2 + Z^2). \tag{22}$$

Similarly, the velocity along acoustic path CD from transducer 98 to transducer 100, Vcd, is given by:

$$V_{cd} = -V_x^* \cos(\Theta_{cdx}) - V_y^* \cos(\Theta_{cdy}) - V_z^* \cos(\Theta_{cdz}) \tag{23}$$

where $$\cos(\Theta_{cdx}) = X/L = A \tag{24}$$

$$\cos(\Theta_{cdy}) = Y/L = B, \tag{25}$$

and $$\cos(\Theta_{cdz}) = Z/L = C. \tag{26}$$

In addition, the velocity along acoustic path EF from transducer 102 to transducer 104, $V_{ef}$, is given by:

$$V_{ef} = V_x^* \cos(\Theta_{efx}) - V_y^* \cos(\Theta_{efy}) + V_z^* \cos(\Theta_{efz}) \tag{27}$$

where $$\cos(\Theta_{efx}) = X/L = A \tag{28}$$

$$\cos(\Theta_{efy}) = Y/L = B, \tag{29}$$

and $$\cos(\Theta_{efz}) = Z/L = C. \tag{30}$$

Finally, the velocity along acoustic path GH from transducer 106 to transducer 108, $V_{gh}$, is given by:

$$V_{gh} = V_x^* \cos(\Theta_{ghx}) + V_y^* \cos(\Theta_{ghy}) - V_z^* \cos(\Theta_{ghz}) \tag{31}$$

where $$\cos(\Theta_{ghx}) = X/L = A \tag{32}$$

$$\cos(\Theta_{ghy}) = Y/L = B, \tag{33}$$

and $$\cos(\Theta_{ghz}) = Z/L = C. \tag{34}$$

These relationships may be summarized as follows:

$$V_{ab} = -A^* V_x + B^* V_y + C^* V_z \tag{35}$$

$$V_{cd} = -A^* V_x - B^* V_y - C^* V_z \tag{36}$$

$$V_{ef} = +A^* V_x - B^* V_y + C^* V_z, \tag{37}$$

$$V_{gh} = +A^* V_x + B^* V_y - C^* V_z. \tag{38}$$

Therefore:

$$V_{ab} + V_{cd} = 2^* A^* V_x, \tag{39}$$

or $$V_x = -(V_{ab} + V_{cd})/2A, \tag{40}$$

or $$V_{ef} + V_{gh} = +2^* A^* V_x, \tag{41}$$

or $$V_x = +(V_{ef} + V_{gh})/2A, \tag{42}$$

$$V_{cd} + V_{ef} = -2^* B^* V_y \tag{43}$$

or $$V_y = -(V_{cd} + V_{ef})/2B, \tag{45}$$

$$V_{ab} + V_{gh} = +2^* B^* V_y, \tag{44}$$

or $$V_y = +(V_{ab} + V_{gh})/2B, \tag{46}$$

$$V_{ab} + V_{ef} = +2^* C^* V_z, \tag{47}$$

or $$V_z = +(V_{ab} + V_{ef})/2C, \tag{48}$$

$$V_{cd} + V_{gh} = 2^* C^* V_z, \tag{49}$$

or $$V_z = (V_{cd} + V_{gh})/2C, \tag{50}$$

Therefore, if $V_x < 0$ and $V_y < 0$, $V_{ef}$ is contaminated and should be rejected. Similarly, if $V_x < 0$ and $V_y > 0$, $V_{cd}$ is contaminated and should be rejected. If $V_x > 0$ and $V_y < 0$, $V_{gh}$ is contaminated and should be rejected. If $V_x > 0$ and $V_y > 0$, $V_{ab}$ is contaminated and should be rejected.

While this invention has been described with reference to its presently preferred embodiments, its scope is not limited thereto. Rather, such scope is only limited in so far as defined by the following set of claims and includes all equivalents thereof.

What is claimed is:

1. An acoustic current meter, comprising:
   first, second, third and fourth transducers in contact with a current to be measured, each transducer having means for transmitting a continuous wave (CW) burst through the current and means for sensing a continuous wave burst in the current;
   means for generating a series of reference signals which are phase shifted versions of each CW burst as transmitted;
   a single receiver for selectively receiving output from the sensing means of each of said transducers;
   means for determining the phase shift of the CW bursts sensed by the sensing means of each of the transducers by comparison with the series of phase shifted reference signals; and
   means for determining a current profile from component of the current parallel with paths between the transducers in accordance with the difference in phase shifts experienced by CW bursts transmitted in both directions therebetween by eliminating data from a path between two transducers contaminated by wake turbulence.

2. An acoustic current meter, comprising:
   first and second transducers in contact with a current to be measured, each transducer having means for transmitting a continuous wave (CW) burst through the current and means for sensing a continuous wave burst in the current;
   means for generating a series of reference signals which are phase shifted versions of each CW burst as transmitted;
   a single receiver for receiving output from the sensing means of said first and second transducers;
   a switch for selectively coupling the receiver to the sensing means of one of the transducers;
   means for determining the phase shift of the CW bursts sensed by the sensing means of each of the transducers by comparison with the series of phase shifted reference signals;
   means for determining a component of the current parallel with a path between the transducers in accordance with the difference in phase shifts experienced by CW bursts transmitted in both directions therebetween;
   third and fourth transducers;
   a central strut supporting said first, second, third and fourth transducers so that paths between pairs of the transducer surround the central strut;
   means for determining the path between a pair of transducers which is contaminated by wake turbulence so that the remaining paths may be used to determine a current profile substantially uncontaminated by the wake turbulence; and
   a mooring attachment at the bottom of the central strut.

3. The acoustic current meter claimed in claim 2, further comprising:
   a first cross bar passing through the central strut for supporting the first and third transducers at opposite sides of the central strut; and
   a second cross bar passing through the central strut for supporting the second and fourth transducers at opposite sides of the central strut.

4. The acoustic current meter claimed in claim 3, wherein the first and second cross bars are perpendicular to each other horizontally plane and separated from each other vertically.

5. An acoustic current meter, comprising: first, second, third and fourth transducers in contact with a current to be measured, each transducer having means for transmitting a continuous wave (CW) burst through the current and means for sensing a continuous wave burst in the current;
   means for generating a series of reference signals which are phase shifted versions of each CW burst as transmitted;
   a single receiver for selectively receiving output from the sensing means of each of said transducers;
   means for determining the phase shift of the CW bursts sensed by the sensing means of each of the transducers by comparison with the series of phase shifted reference signals;
   means for determining a component of the current parallel with a path between two of said transducers in accordance with the difference in phase shifts experienced by CW bursts transmitted in both directions therebetween; and
   means for determining the path between a pair of transducers which is contaminated by wake turbulence so that the remaining paths are used to determine a substantially uncontaminated current profile.

6. The invention of claim 5, further comprising:
   a central strut supporting said first, second, third and fourth transducers so that paths between pairs of the transducer surround the central strut.

7. The invention of claim 6 wherein the central strut further comprises:
   a mooring attachment at the bottom of the central strut.

8. The invention of claim 7 wherein the means for determining a contaminated path further comprises:
   means for determining which is contaminated by wake turbulence from the mooring attachment.

* * * * *